(No Model.) 6 Sheets—Sheet 1.
T. H. HEBERLING & A. BERNAUER.
FENCE MAKING MACHINE.
No. 377,756. Patented Feb. 14, 1888.
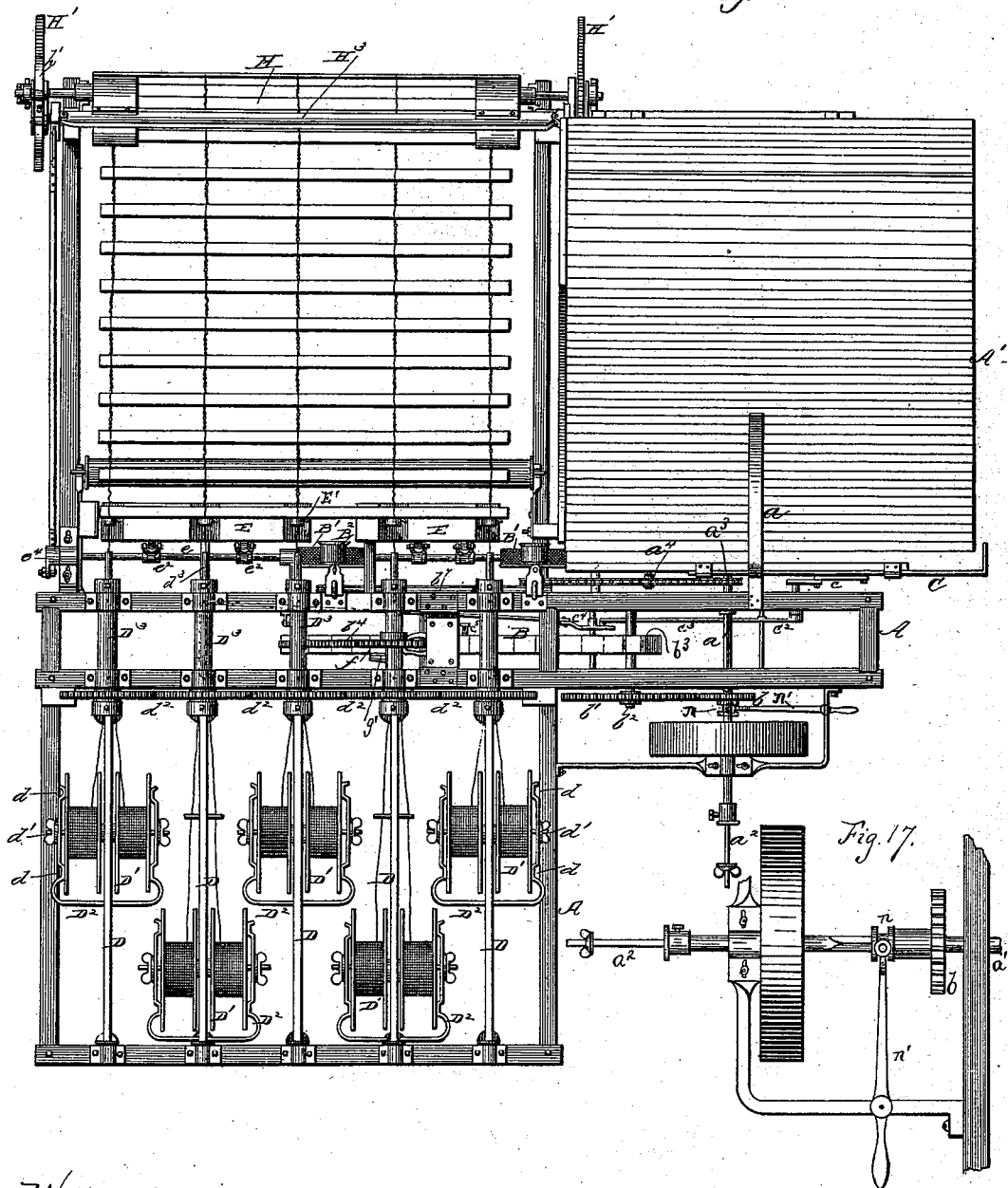

(No Model.) 6 Sheets—Sheet 2.
T. H. HEBERLING & A. BERNAUER.
FENCE MAKING MACHINE.
No. 377,756. Patented Feb. 14, 1888.
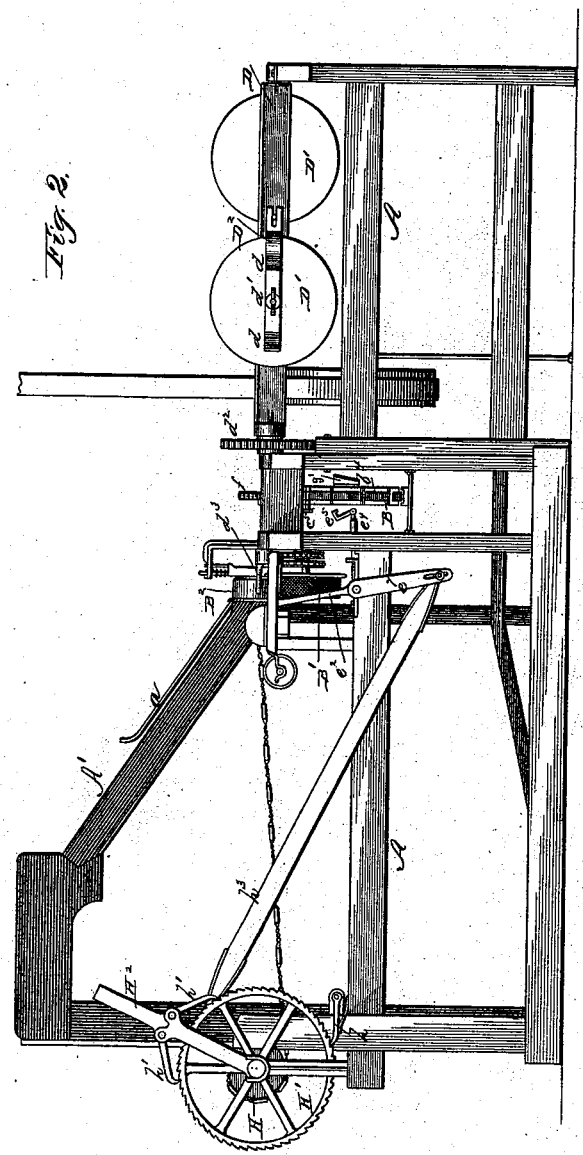
Witnesses.
Inventors.
Thomas H. Heberling
Albert Bernauer (No Model.) 6 Sheets—Sheet 3.
T. H. HEBERLING & A. BERNAUER.
FENCE MAKING MACHINE.
No. 377,756. Patented Feb. 14, 1888.
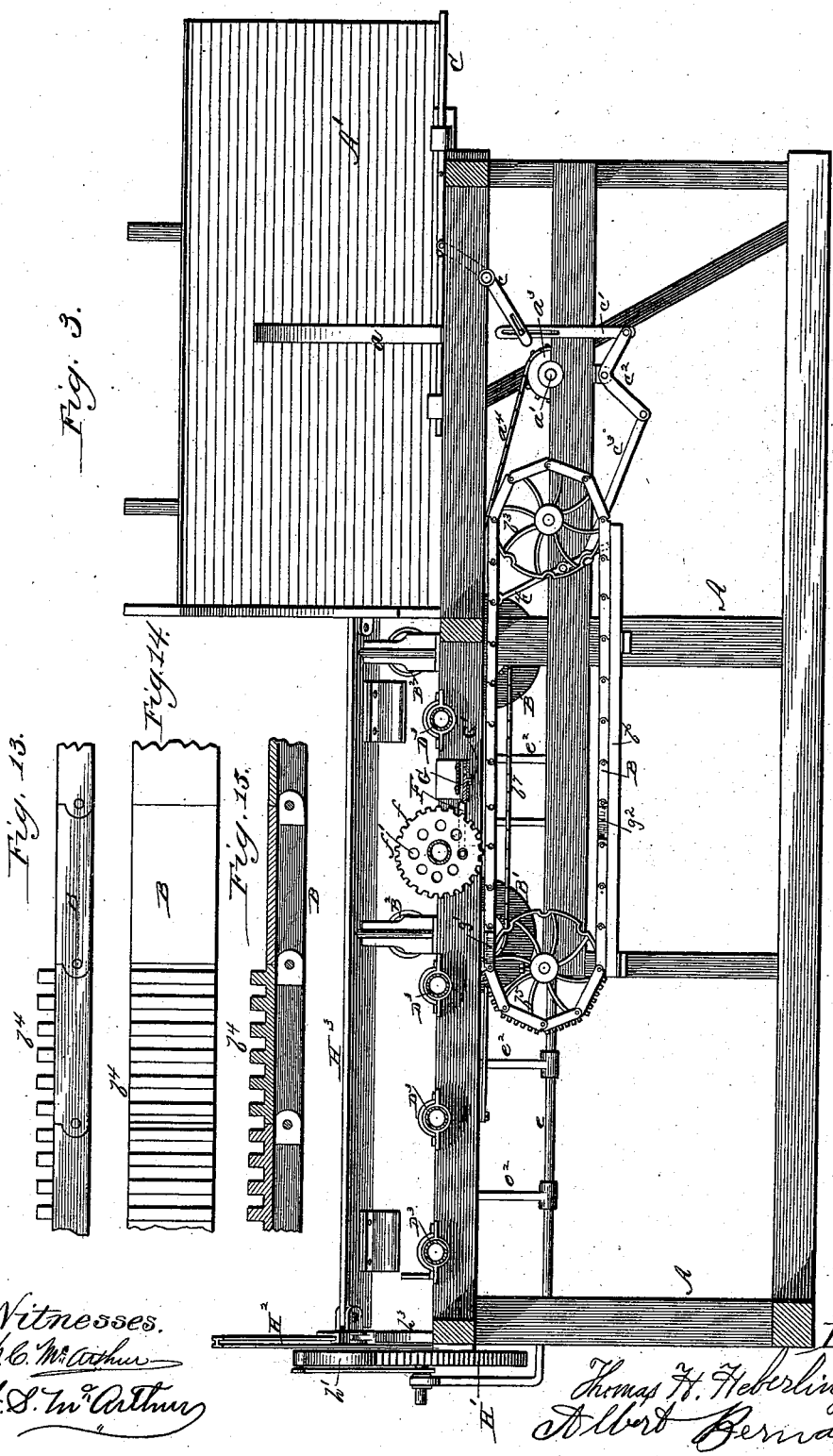

(No Model.) 6 Sheets—Sheet 4.
T. H. HEBERLING & A. BERNAUER.
FENCE MAKING MACHINE.
No. 377,756. Patented Feb. 14, 1888.
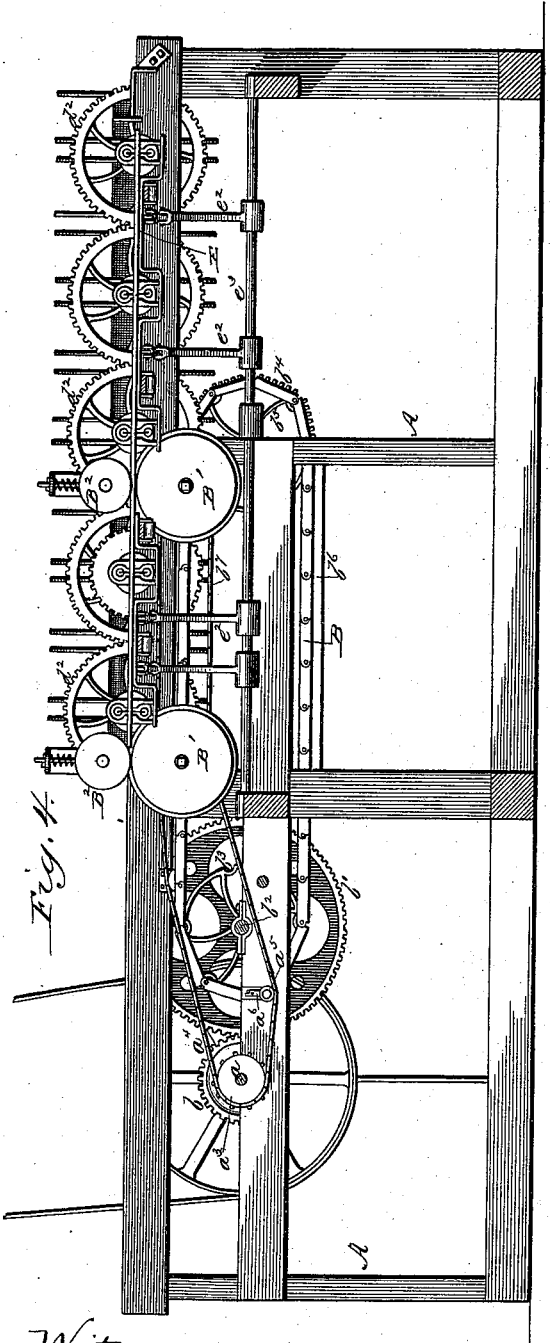
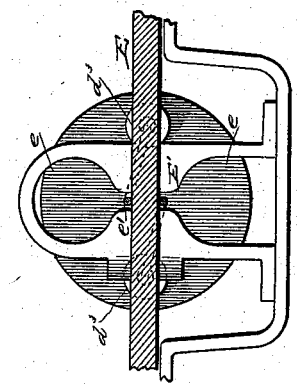
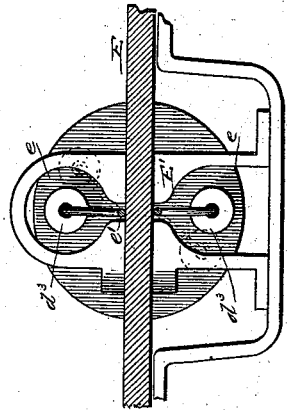
Witnesses,
W. Rossiter.
H. C. McArthur
Inventor:
Thomas H. Heberling.
Albert Bernauer.
N. PETERS, Photo-Lithographer, Washington, D. C.

(No Model.) 6 Sheets—Sheet 5.
T. H. HEBERLING & A. BERNAUER.
FENCE MAKING MACHINE.
No. 377,756. Patented Feb. 14, 1888.
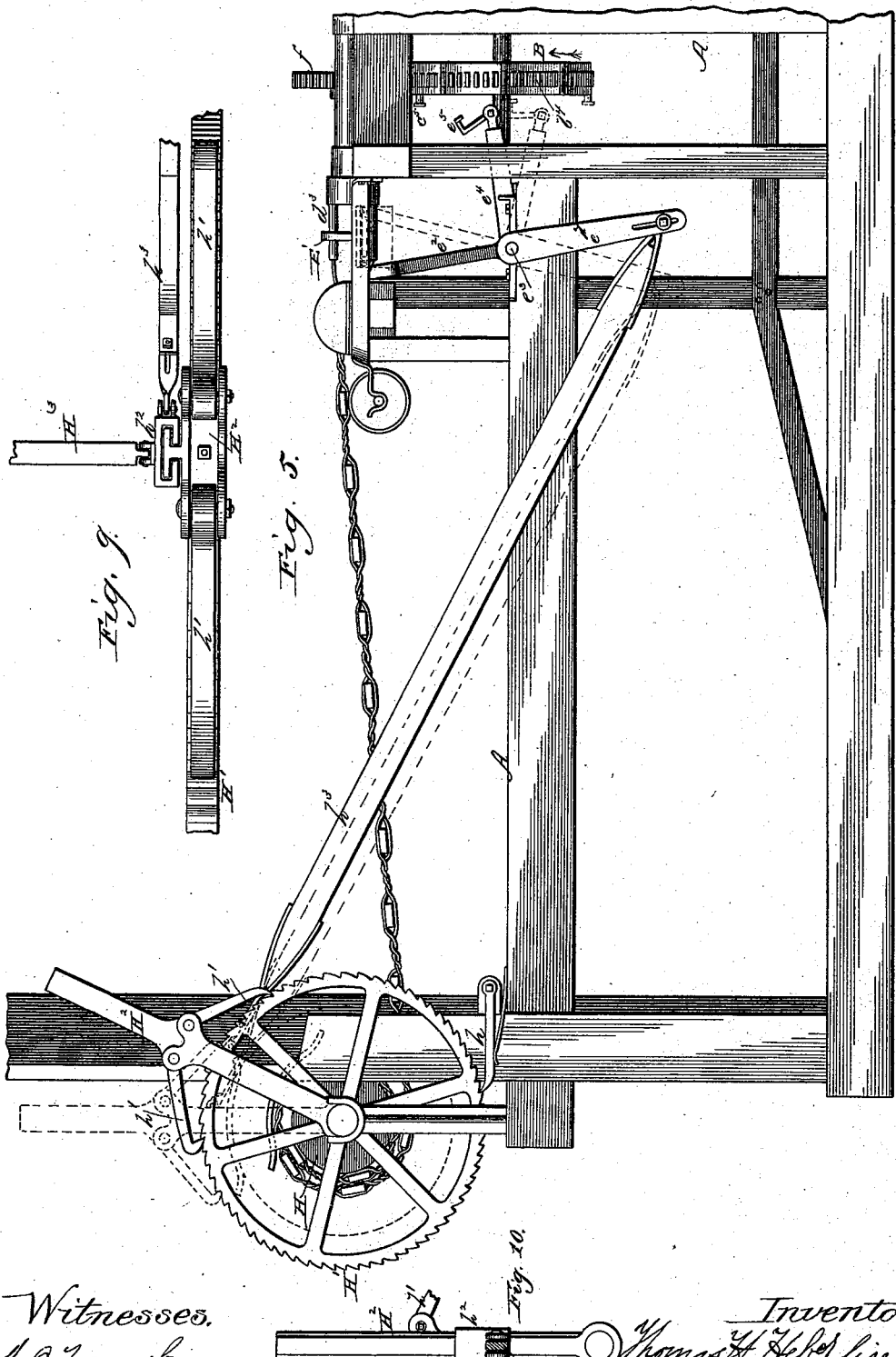
Witnesses:
Inventor:
Thomas H. Heberling.
Albert Bernauer (No Model.) 6 Sheets—Sheet 6.
T. H. HEBERLING & A. BERNAUER.
FENCE MAKING MACHINE.
No. 377,756. Patented Feb. 14, 1888.
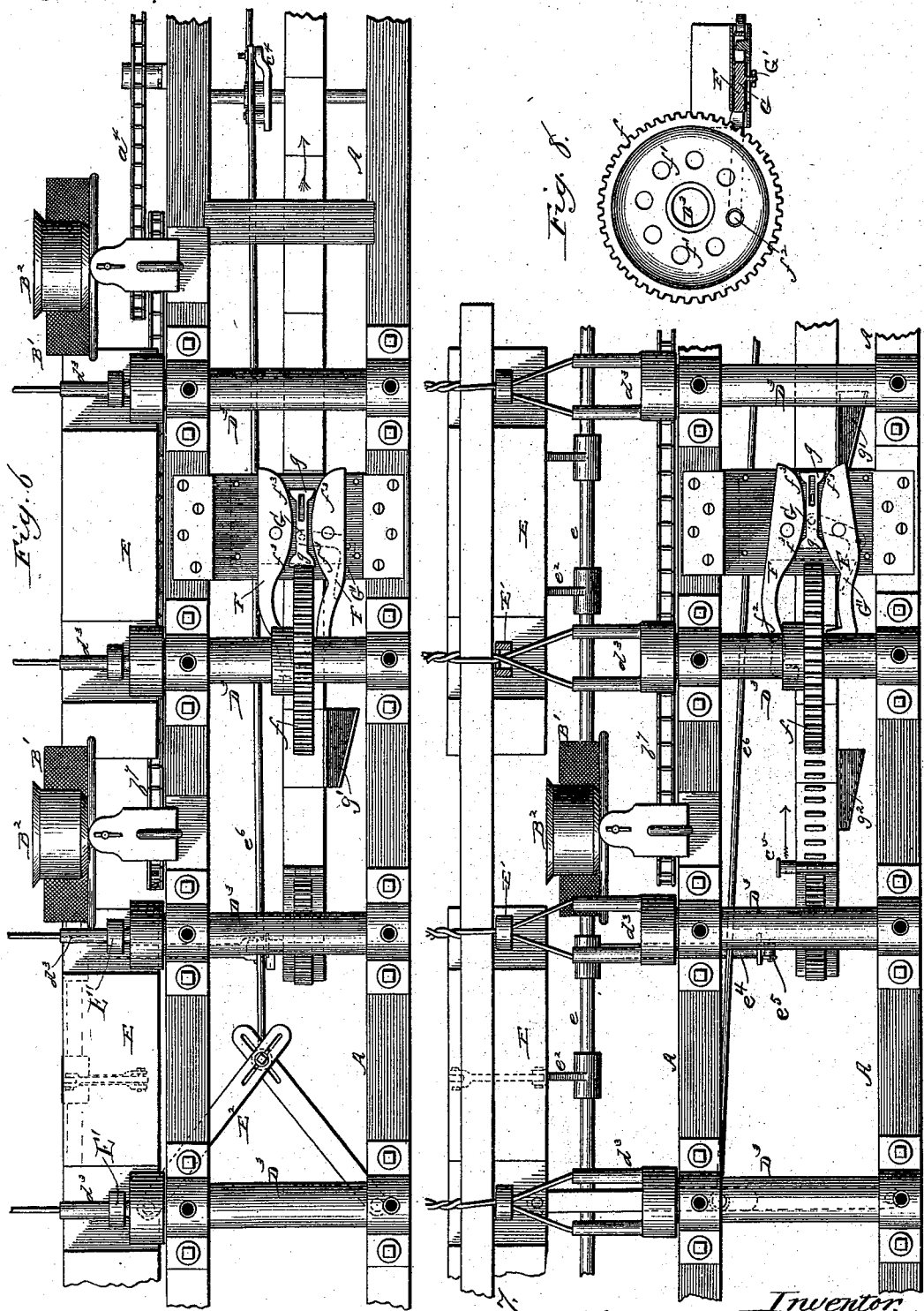

UNITED STATES PATENT OFFICE.

THOMAS H. HEBERLING, OF SPRINGFIELD, AND ALBERT BERNAUER, OF CHICAGO, ILLINOIS.

FENCE-MAKING MACHINE.

SPECIFICATION forming part of Letters Patent No. 377,756, dated February 14, 1888.

Application filed August 28, 1886. Serial No. 212,112. (No model.)

*To all whom it may concern:*

Be it known that we, THOMAS H. HEBERLING, of Springfield, in the county of Sangamon and State of Illinois, and ALBERT BERNAUER, of Chicago, Cook county, Illinois, have invented certain new and useful Improvements in Fence-Making Machines; and we do hereby declare the following to be a full, clear, and exact description of the invention, such as will enable others skilled in the art to which it pertains to make and use it, reference being had to the accompanying drawings, which form part of this specification.

This invention relates to an improvement in fence-machines; and it consists in certain peculiarities of the construction and arrangement of the same, whereby the entire operation of feeding the picket, pressing it up to position, twisting the wire, withdrawing the twisting mechanism, and reeling up the completed fence is automatically performed by the machine, substantially as will be hereinafter more fully described, and more particularly pointed out in the claims.

In order to enable others skilled in the art to which our invention pertains to make and use the same, we will now proceed to describe its construction and operation, referring to the accompanying drawings, in which—

Figure 1 is a top plan view of the machine complete for use. Fig. 2 is a side elevation of the same. Fig. 3 is a transverse vertical section of the machine, looking rearward and taken just in front of the feed-table. Fig. 4 is a similar section looking toward the front of the machine from the same point. Fig. 5 is an enlarged side view of one portion of the machine, showing the devices for actuating the take-up reel. Fig. 6 is an enlarged detail plan view of the twisting mechanism in a locked position, and Fig. 7 a similar view unlocked. Fig. 8 is a detail view of the gear that drives this mechanism. Fig. 9 is a detail plan view of the feeding-pawls of the take-up reel. Fig. 10 is a cross-section of the frame on which these pawls are carried. Figs. 11 and 12 are detail views of the twisters and their guide-loops in two positions. Fig. 13 is a side view, Fig. 14 a plan view, and Fig. 15 a longitudinal section, of the endless driving-chain or cogged belt. Fig. 16 is a detail view of the adjustable journal-boxes. Fig. 17 is a detail view of the bobbin-winder and its shifting pinion.

A represents the main frame of this machine, which is constructed of any desired and suitable size and shape, and is at one side provided with a receiving-table, A', for the pickets to be used, the forward portion of this table being inclined in order that the pickets, when laid thereon, may slide freely down to the feeding devices located at the foot of this incline, as will be presently explained. The table is also provided with a spring-arm, $a$, which lies over it, as in Figs. 1 and 2, and prevents the pickets from getting out of place, as well as causing them to approach the feed in a single layer, from which only a single one is fed forward at one time.

Just forward of the feeding-incline is journaled the main driving-shaft $a'$, on which is an ordinary driving-pulley connected with any suitable motor or power, as required, by a belt, in the usual manner. On the forward end of this short driving-shaft is a spindle, $a^2$, for holding the spools or bobbins on which the wire is wound for use, and on the rear end of the shaft is a sprocket-wheel, $a^3$, connected with the feed-rolls by a chain belt, $a^4$, for driving them, as seen in Fig. 4. This driving-belt passes over or around a guide-pulley or idler, $a^5$, upon a hinged arm, $a^6$, pivoted on the main frame, and which, when in the position seen in Fig. 4, retains sufficient tension upon the belt to cause it to properly perform its duty; but when this arm is turned aside on its pivot the belt or chain is left slack, and may then be readily thrown off the sprocket-wheel $a^3$ and the feed-rolls allowed to rest while the main shaft is being used for winding the bobbins.

On the main shaft is also a toothed pinion, $b$, which is arranged to slide upon the shaft in any of the well-known ways known to mechanics, and which meshes with a gear, $b'$, upon a shaft, $b^2$, journaled in the main frame beside the driving-shaft, and provided with a sprocket or similar wheel, $b^3$, around which passes an endless chain, B, formed of a series of bars of suitable width hinged together; and it will be noticed that some of the links composing this chain are plain, while others are formed with cogs or teeth $b^4$, thus forming a mutilated chain gearing, which is utilized to drive the twisting and other forming mechanism, as will be presently understood. While the pinion $b$ is, as stated, made to shift in any desirable way, we have herein shown it as provided with a grooved hub, $n$, with which is engaged a shifting-lever, $n'$, pivoted on the main frame, as in Fig. 17. This mutilated chain gear is passed over a second wheel, $b^5$, near the other side of the machine, and between these wheels it is supported and prevented from sagging away from its work by means of bars or plates $b^6$, as shown.

On the main frame, in line with the lower end of the inclined feeding-table, is journaled a pair of feed-rolls, $B'$, connected by a driving-belt, $b^7$, so that one is driven from and in unison with the other, and one of said rolls is also provided with a sprocket driven by the chain belt $a^4$, as already explained. The faces of these rolls are roughened, as shown, in order that they may readily seize and carry forward the pickets, and each is also provided with a light flange on one side to prevent the picket from swerving from its true course. This is fully represented in Figs. 4, 6, and 7. Above each roughened feed-roll is placed a spring-pressed roll, $B^2$, having a free play vertically in its supporting-bracket; and it will be at once seen that when the picket is fed in it is seized between the plain and roughened rolls and carried forward to proper position, and is not in any way injured by the operation, while the feed is positive and accurate. It will be at once seen by reference to the drawings that the flanges on these rolls are small, and while effecting this object of guiding the picket in a direct line while it is being fed in, yet do not offer any obstruction to its being pushed aside into the wire at a subsequent stage, as when pressure is brought to bear on the picket. In such case the spring-rolls $B^2$ give in their boxes sufficiently to allow of the small flanges being drawn up and the picket pushed under them, while the roll at once drops back to place.

On the lower forward end of the inclined table is arranged in suitable guides a sliding arm, C, formed with a projection on its rear end to engage the lowermost picket and push it forward till seized by the feed-rolls. To this arm is jointed an elbow-lever, $c$, pivoted on the main frame and connected by a link, $c'$, with a second elbow-lever, $c^2$, which is in turn connected by a second link, $c^3$, with a lever, $c^4$. The endless mutilated chain gear is provided on one side with a projecting pin, $c^5$, as in Fig. 7, and in the movement of this chain gear the pin strikes the lever $c^4$, and by the intermediate system moves the sliding arm forward, and after the pin has passed around the sprocket-wheel it again engages the lever and causes the reverse motion of the slide to the normal position seen in Fig. 3, thus accomplishing the automatic feed of the pickets at the proper intervals during the operation of the machine.

In the forward part of the main frame are journaled a series of horizontal shafts, D D, of any desired number; but in the present instance five are represented. On each shaft is carried a pair of reels or bobbins, $D'$, these being one upon each side of the shaft on a common spindle, and each pair is provided with a U-shaped tension-spring, $D^2$, formed with two bearing-points, $d\ d$, on each end and clamped against the bobbins by thumb nuts $d'$ on the ends of the spindle, as in Fig. 1. Each shaft is provided with a toothed gear, $d^2$, the series of gears intermeshing, and thereby moving in unison, as shown. Upon their rear ends the shafts are provided with tubular sections $D^3$, (more clearly seen in Figs. 6 and 7,) and are journaled in suitable boxes on the main frame. The extreme rear end of each hollow shaft is provided with a pair of hollow prongs or twisters, $d^3$, and it will be seen that the wire contained upon the bobbins is led forward through the hollow portions, and thus protected from contact with the journal-boxes, and pass out through the hollow twisting-prongs. In rear of and beneath these prongs is placed a bar or frame, E, arranged to slide forward and backward in the main frame to and from the twisting-prongs, and on this sliding frame is formed a series of wire-guides, $E'$. (Clearly shown in Figs. 11 and 12.) These guides are formed with openings $e$ for the passage of the twisting-prongs when the guides are slid up toward them, and a slot, $e'$, is provided, connecting the two openings, which guides the wires and holds them from spreading out of place upon the picket when the twisting begins.

By reference to the drawings it will be seen that the sliding bar or frame E is secured by a series of arms, $e^2$, to a rock-shaft, $e^3$, journaled in the frame below the slide, and is thereby prevented from any tendency to twist and bind in its movements. This sliding frame is connected to a convenient portion of the main frame by means of a pair of link-arms, $E^2$, which are clearly shown in Fig. 6. These links are pivoted upon the slide and the main frame, as indicated, and are also pivoted together at their adjacent ends, thereby forming a toggle-connection, and when the slide is drawn forward to permit the feeding of the picket, as in Fig. 6, the toggle is broken. When the lath or picket has been fed, however, to the proper distance, the links are straightened out to push back the frame to the position seen in Fig. 7. This movement causes the guide-loops $E'$ to press the picket out from between the feeding-rolls and carries it back tightly into the bight of the already-twisted wires, and holds it there till the next movement of the twisting-prongs secures it by twisting the wire in front, thus tightly clamping each picket and preventing any possibility of its slipping out of place. To effect the sliding movement of this frame, the rock-shaft $e^3$ is provided, as in Fig. 5, with a projecting arm, $e^4$, which is on its end provided with a hook, $e^5$, which is engaged by the pin $c^5$ on the chain gear, and the arm thus lifted is caused to rock the shaft $e^3$ and slide back the frame E. To return this frame, which is locked when pressed back, by the toggle-links, a rod, $c^6$, is connected to the joint of these links, and is extended across the machine and secured to the rock-lever $c^4$, and when the pin $c^5$ engages this lever to feed the picket to the rolls it at the same time breaks the toggle and draws forward the sliding frame to receive the picket, as will be evident.

It will be noticed that one of the tubular shafts $D^3$ is provided with a gear, $f$, located just over the endless-chain gear, as in Figs. 6, 7, and 8, which gear drives all the reel-shafts through the intermeshing series of gears thereon, previously described. The web of this gear $f$ is formed with a series of holes or recesses, $f'$, and upon the main frame, adjacent to the gear, is pivoted a pair of lever-latches, F, the points $f^2$ of which are bent around the rim of the wheel and engage its recesses, as shown. The rear ends or heels of these locking-latches are formed with inclines $f^3$, and between them is a slide, G, having a head, $g$, on each end. This slide is suitably guided in any manner desired, but herein represented as formed with a slot working over a pin or stud on the plate over which it moves. This slide is actuated by an angle-lever, G', (shown in dotted lines in Figs. 6 and 7,) one end of which is connected to the slide and the other left free. The endless gear-belt is provided with two projecting inclines, $g'$ $g^2$, which engage this lever, one of them shifting it in one direction and the other reversing it.

It will be understood from this description that when shifted in the position of Fig. 6 the headed slide closes the latches and firmly locks the whole twisting mechanism from any movement while the picket is fed and pushed into place, but that at this point the slide is shifted, as in Fig. 7, at once opening the latches to release the gear, which is at the same time engaged by the toothed portion of the driving chain belt, and the operation of twisting the wires takes place.

The line of fence completed is from the twisting devices carried back, supported by one or more rollers, and attached to the drum or reel H, on which it is wound up as fast as made. This drum is journaled at the rear end of the machine in suitable bearings, and is on each end provided with a ratchet-wheel, H', for winding it up, and a stop-pawl, $h$, is hinged upon some adjacent part of the frame to engage the ratchets and retain the fence as it is reeled in. (See Fig. 5.)

On each end of the reel-shaft is journaled an arm, $H^2$, on each of which is pivoted one or more feeding-pawls, $h'$, also engaging the ratchet-wheels to feed them and their reel-drum forward. The arms $H^2$ are connected across the reel by a bar, $H^3$, which is upon each end provided with boxes $h^2$, sliding upon the arms, and to these boxes are secured the pitmen $h^3$, connecting them with suitable arms, $e^7$, upon the rock-shaft $e^3$. This is more clearly seen in Figs. 5, 9, and 10, and it will be at once understood that as this rock-shaft moves in the operation of securing the picket in the twisted wires it at the same time reels up the portion of fence just formed, and draws it rearward just enough to permit the operation upon a fresh picket. At the same time the roll of the fence wound upon the drum increases in diameter and pushes the cross-bar $H^3$ out upon the pawl-arms, and of course the pitman-connections to the sliding boxes are correspondingly drawn away from the reel-center. This has the effect of not only increasing the leverage and power of the pitmen, but by gradually changing their point of connection to the pawl-arms gives a smaller stroke and diminishes the feed of the reel in exact proportion to the size of the fence-roll upon it, and retains the same strain upon the fence under operation.

In operation the pickets to be used are spread in a single layer upon the inclined table, and, the machine being started, the pin $c^5$ on the gear-belt B engages the rock-lever $c^4$, and at the same time unlocks and draws back the sliding frame E and carries forward the feeding-slide with one picket till it is seized and fed in by the rolls to its proper position. As soon as the picket has been carried far enough the pin $c^5$ engages the hooked arm on the rock-shaft and throws back the sliding frame, pushing the picket sidewise from between the feeding-rolls and forcing it into the bight of the twisted wires, where it is held and the sliding frame locked by the jointed links, as before described. At the same time the cam projection $g'$ upon the belt B shifts the headed slide G and unlocks the gear $f$, which is at once engaged by the teeth upon the belt B, and the twisters are revolved to twist the wires and confine the picket in place. As soon as the requisite number of twists have been given to the wire the toothed portion of the belt has passed the gear $f$, and the latter is locked by the second cam projection, $g^2$, on the belt. While the pin $c^5$ again engages the rock-lever the sliding table is retracted, the reel fed forward to take up the formed fence, and a new picket fed in and the operation repeated, the fence thus made being in one piece of any desired length, only limited by the quantity of wire upon the bobbins and the size of the roll into which it is practicable to form it.

It will be particularly observed that every part of the operation is automatically performed without any attention on the part of the operator, and the parts of the machine are properly timed in their operation, so that the fence is all alike, and the position and retention of each picket are perfect and in exact correspondence with every other one in a given line of fence.

It will be evident that the fence so made is not necessarily restricted to the single length of picket or number of wire strands herein shown.

In Fig. 16 we have shown the journal-boxes in which the gear-belt wheels are carried, and which consist of a plate, o, secured upon the main frame, and having on one end a lug, o', through which is a set-screw, o². Upon this plate is a second one, m, carrying the shaft, and formed with slots m', through which are passed screws m², to secure it to the under plate. It will be seen that the upper plate is forced out by the screw o² and secured by its set-screws m² to tighten the gear-belt.

Having thus fully described our invention, what we claim as new, and desire to secure by Letters Patent, is—

1. In a fence-machine, the combination, with an inclined table for the pickets, of a spring-arm lying just above the same, beneath which the pickets are passed in a single layer, substantially as and for the purpose set forth.

2. In a fence-machine, the combination, with an endless gear-belt, the twisting devices, and an intermediate connection between the belt and twisters for imparting motion from one to the other, of a main shaft provided with a sliding pinion, a shifting-lever for moving this pinion on the shaft, a gear interposed between said pinion and the endless gear-belt, and a bobbin-spindle on the main shaft, whereby the main shaft is disconnected from the gear-belt while winding the bobbins, substantially as and for the purpose set forth.

3. In a fence-machine, the combination, with a main driving-gear for the wire-twisting mechanism, and a locking-dog pivoted upon the frame and engaging the same, of the endless gear-belt for driving the gear, provided with cam projections for operating the lock, substantially as and for the purpose set forth.

4. In a fence-machine, the combination, with a main gear for driving the twisters, formed with holes or recesses in its body, and a pair of locking-dogs pivoted on the adjacent frame and formed with two inclines, of a double-headed slide lying between the dogs and acting on said inclines to shift them, an angle-lever connected to said slide, and an endless chain belt partially toothed and provided with two cam projections to actuate the lever, substantially as and for the purpose set forth.

5. In a fence-machine, a series of twisting-shafts geared together to rotate in unison in reverse directions, and each provided with two wire spools or bobbins, in combination with a U-shaped tension-spring formed with two elevations on each arm to bear upon the spools, and an adjusting-nut upon the spindle bearing against said spring, substantially as and for the purpose set forth.

6. In a fence-machine, the combination, with a reciprocating frame for forcing the picket into position, of a pair of links pivoted together and to the reciprocating and main frames, whereby when the former is forced back the links form a toggle and lock the frame in place, substantially as and for the purpose set forth.

7. In a fence-machine, the combination, with a reciprocating frame for forcing the picket into position for securing, of a pair of links pivoted together and to the reciprocating and main frames for locking the former, a rod connected to the joint of said links, and a pin or stud upon the main driving gear-belt for actuating this rod to break the lock at the proper time, substantially as and for the purpose set forth.

8. In a fence-machine, the combination, with a take-up reel for the completed fence, provided at each end with a ratchet-wheel, and a movable arm provided with the feeding-pawls, of a transverse bar between the pawl-arms and sliding vertically upon the same, and the actuating-pitmen connected to the sliding cross-bar, whereby the pitman-connection is forced away from the reel-center as the fence is wound up, substantially as and for the purpose set forth.

9. In a fence-machine, the combination, with an inclined receiving-table for the pickets, provided with a sliding feeding-arm upon a guide on its lower edge, and a series of levers connecting this slide with a rock-lever on the main frame, of an endless chain or gear belt for driving the twisting mechanism, provided on one edge with a pin or projection to engage and actuate said rock-lever, substantially as and for the purpose set forth.

10. In a fence-machine, the combination, with the twisting mechanism, of an endless driving-belt for the same moving always in the same direction, and formed of a series of jointed links, a portion of which are plain and a portion formed with rack-teeth, whereby the belt, though constantly moving, imparts an intermittent motion to the engaged mechanism, substantially as and for the purpose set forth.

11. In a fence-machine, the combination, with a reciprocating frame for forcing the pickets into position, and a rock-shaft connected with this frame and provided with a projecting hooked arm, of the twisting mechanism and its endless gear driving belt provided with a pin or stud for engaging the hooked arm and operating the sliding frame, substantially as and for the purpose set forth.

In testimony whereof I affix my signature in presence of two witnesses.

THOMAS H. HEBERLING.

Witnesses:
J. N. REECE,
MARK H. PATTEN.

In testimony whereof I affix my signature in presence of two witnesses.

ALBERT BERNAUER.

Witnesses:
W. E. REID,
O. C. ST. CLAIR.